United States Patent
Schroten et al.

[19]

[11] Patent Number: 6,062,643
[45] Date of Patent: May 16, 2000

[54] VEHICLE SEAT HAVING A HEADREST AND VEHICLE HAVING SUCH SEAT

[75] Inventors: Mark Schroten, Antwerp, Belgium; Cornelis Gerardus Huijskens, Voorschoten, Netherlands

[73] Assignee: Nederlandse Organisatie voor Toegepast natuurwetenschappelijk Onderzoek TNO, Netherlands

[21] Appl. No.: 09/250,523

[22] Filed: Feb. 16, 1999

[30] Foreign Application Priority Data

Feb. 18, 1998 [NL] Netherlands ............................ 1008342

[51] Int. Cl.[7] ....................................................... B60N 2/42
[52] U.S. Cl. ................................ 297/216.13; 297/216.12; 297/216.14
[58] Field of Search .......................... 297/216.1, 216.12, 297/216.13, 216.14, 216.16, 216.18, 391, 452.18

[56] References Cited

U.S. PATENT DOCUMENTS

| | | |
|---|---|---|
| 2,636,552 | 4/1953 | Long . |
| 3,838,870 | 10/1974 | Hug . |
| 4,109,959 | 8/1978 | Barecki et al. . |
| 5,468,045 | 11/1995 | Weber . |
| 5,641,198 | 6/1997 | Steffens, Jr. . |
| 5,882,072 | 3/1999 | Morlock . |

FOREIGN PATENT DOCUMENTS

| | | |
|---|---|---|
| 0627340 | 7/1994 | European Pat. Off. . |
| 9710117 | 3/1997 | WIPO . |

*Primary Examiner*—Milton Nelson, Jr.
*Attorney, Agent, or Firm*—Londa & Gluck LLP

[57] ABSTRACT

A vehicle seat with a frame supporting a sitting portion, a backrest and a headrest situated above the backrest, the backrest comprising a back support part extending by a top part to a position adjacent the headrest and connected to the frame by a coupling which, during a forward displacement of the frame, from a predetermined acceleration, allows a displacement of at least a part of the back support part against the forward displacement, over a distance predetermined by stopping members arranged between the back support part and the frame, wherein at least the top part of the back support part is arranged for displacement relative to the adjoining headrest which is mounted in such a manner that during the displacement of the back support part allowed by the coupling, the headrest remains stationary relative to the frame.

11 Claims, 2 Drawing Sheets

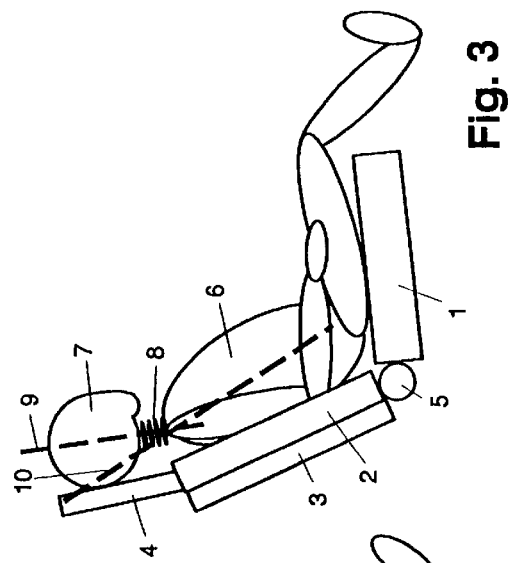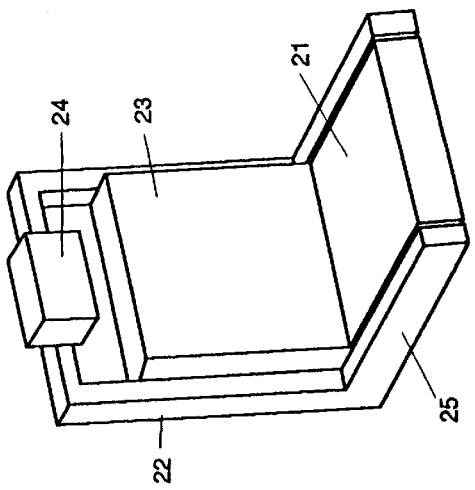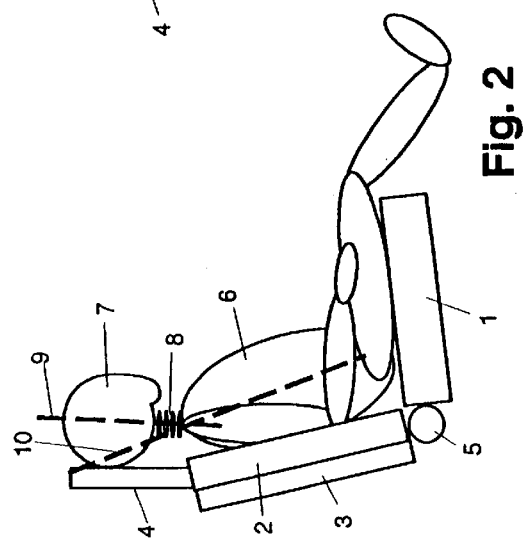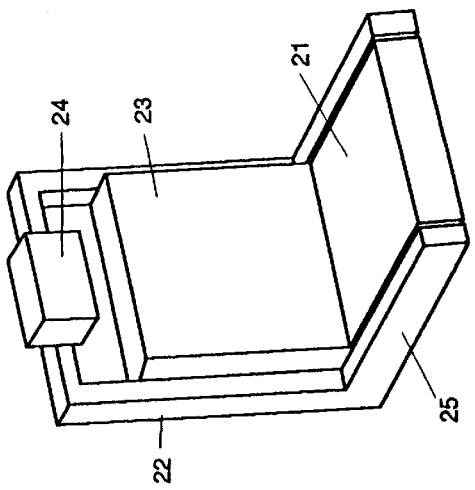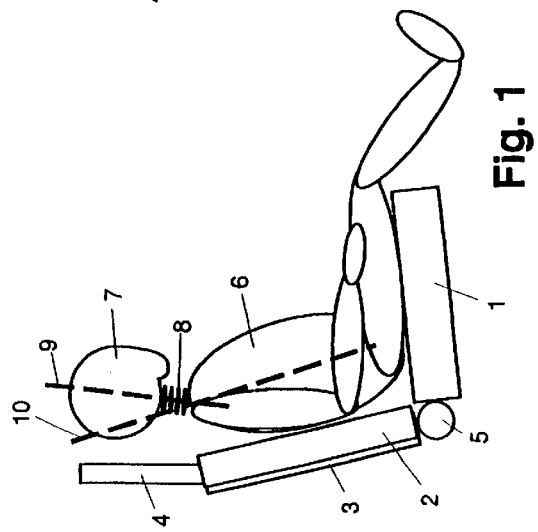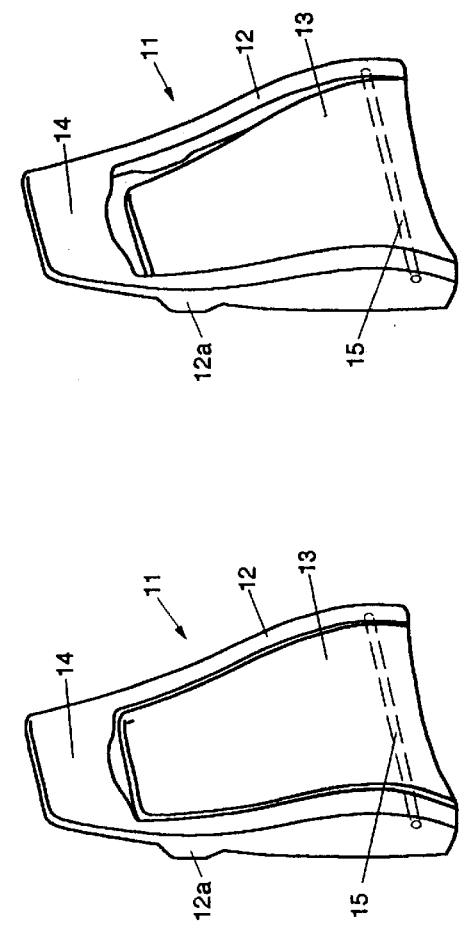

VEHICLE SEAT HAVING A HEADREST AND VEHICLE HAVING SUCH SEAT

BACKGROUND OF THE INVENTION

The invention relates to a vehicle seat with a frame supporting a sitting portion, a backrest and a headrest situated above the backrest, the backrest comprising a back support part extending by a top part to a position adjacent the headrest and connected to the frame by means of a coupling which, during a forward displacement of the frame, from a predetermined acceleration, allows a displacement of at least a part of the back support part against the forward displacement, over a distance predetermined by stopping members arranged between the back support part and the frame, and to a vehicle having such a seat.

When a vehicle is collided with from behind, an impact-or impulse-shaped acceleration and displacement in forward direction will be imposed thereon, and on all parts fixed thereto. A passenger is not fixedly connected to the seat, so that as a result of the mass inertia, his body in the first place remains in position and hence moves backwards relative to the vehicle, while the trunk of the body, sliding across the sitting portion of the seat, is received by the backrest. At that moment, on account of the mass inertia, the passenger's head will not move at first and will then swing backwards, with all its risks of neck injury. The headrest is intended to prevent this swinging backwards. However, such headrest is practically always located at a distance from the head, inter alia because constant contact between head and headrest is experienced as unpleasant and view-obstructing during driving, apart from other, more everyday reasons such as hairdos becoming tousled or problems encountered when a hat is being worn. This means that in the case of a collision as referred to here, the trunk is received virtually immediately and translates over a certain distance together with the head, which subsequently swings backwards. In addition, the backrest, when receiving the trunk, bends along in rearward direction while taking along the headrest which, as is usual, is fixed to the backrest, which increases the distance between the head and the headrest still further.

To achieve that the head is received by the headrest in a better manner during a collision as referred to, there is designed a vehicle seat as described in the preamble of claim 1 and known from WO-A-97/10117, in which the headrest tilts together with the backrest. The backrest is moved up over a slight distance and tilted about an approximately central horizontal axis such that the headrest is displaced in the direction of the head of the user of the seat. Accordingly, the backrest will have to move, in longitudinal direction, relative to the back of the person sitting on the seat. Further, the backrest will have to be vertically displaced and pivoted by a horizontally exerted force. That change of position has to be effected through displacement of pins in slotted holes which incline to a greater or lesser extent. Due to its complexity, the displacement of the backrest along the back of the user of the seat and the required displacement of a pin in a slotted hole extending in the direction of the backrest, by a rearwardly pushing body of the user of the seat, do not guarantee momentary functioning, i.e. displacing upwards and tilting of the backrest within the extremely short period of time for removing the distance normally present between headrest and head before the head starts to move relative to the trunk.

SUMMARY OF THE INVENTION

The object of the invention is to remove said distance between head and headrest in a simpler and faster manner. A further object of the invention is to reduce direct and indirect forces in and on the neck and movements in the neck of the user of the seat, more in particular in such a seat arranged in a vehicle collided with from behind, thus to be able to contribute to the reduced occurrence of whiplash and neck injury in the event of a collision as referred to.

In accordance with the invention, this object is realized if at least the top part of the back support part is arranged for rearward displacement relative to the adjoining headrest which is mounted in such a manner that during said displacement of the back support part allowed by the coupling, said headrest remains stationary relative to the frame. Through these measures, it is effected in an extremely efficient and fast manner that in the event of a collision from behind, due to the rearward displacement of at least the top part of the back support part relative to the headrest, the space between head and headrest is removed by a rearward displacement of the head together with the trunk without requiring a change of the mutual position between head and trunk, while at the moment when the trunk is braked, i.e. at the moment when the head is going to fold backwards relative to the trunk, displacement of the head is prevented through contact with the headrest. This merely requires a rearward displacement of the top part of the back support part that adjoins the headrest, i.e. without sliding along the back of the seat user. By thus preventing as much as possible movements in and on the neck, the direct and indirect forces occurring during the collision, and accordingly the chance of whiplash and neck injury, are reduced as much as possible.

In order to optimize the conditions for keeping the mutual positions of head and trunk unchanged, according to a further embodiment of the invention, it is preferred that the coupling be designed so that the back support part can move parallel to itself while the starting position is substantially maintained. This enables trunk and head to move completely parallel to themselves into the (mutually unchanged) position in which they are both completely and reliably supported.

The displacement of the back support part is bounded by stopping members. These may be projections or pins extending into slotted holes, known per se. Another possibility is that the stopping members are formed by cables or straps between the back support part and the frame.

During the collision, the effect of the shock on the passenger's body will to a greater or lesser extent be gradually taken up by the compression of the covering of the backrest. In the construction according to the invention, this effect can be enhanced if energy-absorbing means are present for damping the displacement of the back support part relative to the frame. When cables or straps are used as stopping members, it is possible in a further advantageous manner that the energy-absorbing means consist of a synthetic foam which fills a housing and in which a cable or strap is embedded and which is deformed or crumbled by the cable or strap which, upon displacement of the back support part relative to the headrest, limits said displacement. Another possibility is to design the stopping members and energy-absorbing means as hydraulic cylinders.

In the latter case, a more or less slight displacement between back support part and frame can be possible in all conditions of use. However, because the displacement of the back support part relative to the headrest in fact only needs to occur in the exceptional case of a collision, it may under normal conditions be desired that the position of the backrest does not change relative to the headrest. This is possible in a simple manner by providing, between the back support part and the frame, members which release the coupling at the predetermined acceleration of the frame, such as breaking members or blocking members which, controlled by an acceleration transducer, are retractable.

Hereinabove, a displacement of the back support part relative to the frame is in each case referred to. It is observed that this concerns a displacement of the back support part relative to the headrest. Such displacement can also be effectively realized if other parts of the seat, such as the remainder of the backrest, the sitting portion or a part thereof, move along with the back support part. If, for instance, a sitting portion moves along, it is also possible to provide the stopping members and/or energy-absorbing means between that sitting portion and the frame.

The invention also relates to a vehicle provided with at least one seat as referred to hereinabove. Typically, the headrest is supported by the seat and the seat with headrest is viewed, manufactured and delivered as a unit. In accordance with the invention, the back support part, at least the top part thereof, should be capable of moving backwards relative to the headrest. However, this can also be realized if the headrest is not supported by the seat, but by another part fixedly connected to the vehicle, for instance a part of a cage construction or a roll bar.

BRIEF DESCRIPTION OF THE DRAWINGS

Presently, the invention will be further specified and explained with reference to exemplary embodiments shown in the accompanying drawings. In these drawings:

FIG. 1 shows a vehicle seat with user under normal driving and sitting conditions;

FIG. 2 shows the situation directly after a collision;

FIG. 3 shows a situation following the situation as shown in FIG. 2;

FIG. 4 shows a vehicle seat rest in the normal position;

FIG. 5 shows the vehicle seat rest of FIG. 4 after a collision;

FIG. 6 schematically shows a vehicle seat in which, in the event of a collision, the backrest and the sitting portion can move jointly;

DESCRIPTION OF THE PREFERRED EMBODIMENTS

Figure 10:
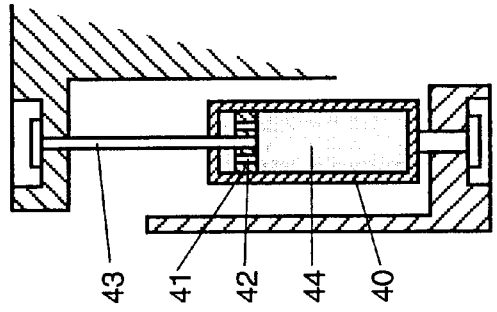
FIG. 10 shows the coupling piece of FIG. 9 after a collision.

FIGS. 1–3 show a vehicle seat connected to a vehicle not shown and comprising a sitting portion 1, a backrest frame 2, a back support part 3 and a headrest 4. The back support part 3 is coupled to the backrest frame 2 in such a manner that under normal sitting and driving loads, those elements function as one whole, yet when particular acceleration forces are exerted, they can move relative to each other over a fixed distance while the coupling is broken. The headrest 4 is connected to the backrest frame 2 in such a manner that these two elements can move forwards and backwards only jointly, while, however, provisions may be present for changing the position of the headrest 4 in height direction relative to the backrest frame 2. Together with the back support part 3, the backrest frame 2 with headrest 4 is adjustable in angle relative to the sitting portion 1 about an axis 5. As is conventional in respect of vehicle seats, still more adjusting mechanisms, not shown here, may be present, such as mechanisms for displacing the vehicle seat forwards and backwards and in height direction.

A user sitting on the vehicle seat and having a trunk 6, a head 7 and a neck 8 is shown schematically.

Under normal driving and sitting conditions, the user of the seat will assume a position as shown in FIG. 1, in which the head 7 is located at a distance from the headrest 4 and the head 7 and the neck 8 include an angle with the trunk 6, as represented by the dashed lines 9 and 10.

In the case of a collision, in particular when the vehicle is collided with from behind, the vehicle and the vehicle seat connected thereto will be subject to a forward acceleration, while the user, sitting more or less loosely on the vehicle seat, will remain in position relative to the fixed world on account of mass inertia. With known vehicle seats, this will involve the trunk 6 being dampingly received by the backrest which moves forwards together with the vehicle. At that moment, the head 7, spaced from the headrest 4, will, on account of the mass inertia, translate backwards relative to the advancing trunk 6 and rotate before it is received by the headrest 4. In spite of this receiving, the movement made by the head 7 may cause whiplash and neck injury.

However, by effecting that the acceleration forces which occur during the collision and press the trunk 6 backwards relative to the vehicle seat, break the coupling between the back support part 3 and the backrest frame 2, the user of the vehicle seat will, together with the back support part 3, move backwards relative to the backrest frame 2 and thus cause the space between the head 7 and the headrest 4 to disappear, so that the position shown in FIG. 2 is obtained. As appears from the black dashed lines 9 and 10, this involves the angular position between trunk 6, neck 8 and head 7 being unchanged relative to each other.

At the moment when the backward displacement of the back support part 3 and the seat user is ended through the blocking of a further displacement of the back support part 3, the head 7 would be inclined to swing backwards. However, as the head 7 is now in contact with the headrest 4, such displacement of the head 7 and the attendant forces in the neck 8 are prevented and the chance of whiplash and neck injury is thus reduced.

After the back support part 3 is blocked against further displacement and the head 7 contacts the headrest 4, the acceleration forces resulting from the collision will usually be further absorbed by causing the backrest as a whole, together with the user, to swivel about the axis 5 over some distance, as shown in FIG. 3. The dashed lines 9 and 10 indicate that also during this movement, the position of the trunk 6 and the head 7 relative to each other remains unchanged.

In the embodiment shown in FIGS. 1–3, the back support part 3 moves backwards substantially parallel to itself. Another possibility is shown in FIGS. 4 and 5, where, in perspective, a backrest 11 is shown which comprises a backrest frame 12 accommodating a back support part 13 and carrying an integrated headrest 14. The back support part 13 is pivotable about an axis 15 which is bearing-mounted in the lower regions of the backrest frame 12. Adjacent its top end, the back support part 13 is detachably coupled to the backrest frame 12 by coupling means accommodated in a bulge 12a. Under normal sitting and driving conditions, the backrest has the appearance as shown in FIG. 4. In the event of a collision which causes the coupling means to become detached, the back support part 13 will swivel backwards into a position defined by stopping means and shown in FIG. 5.

FIG. 6 schematically shows, in perspective, a vehicle seat comprising a sitting portion 21, a backrest frame 22, a back support part 23 and a headrest 24. In this embodiment of the vehicle seat, the sitting portion 21 and the back support part 23 are coupled in such a manner that in the event of a collision, they will jointly move backwards. To enable that movement for the sitting portion 21, two lateral support arms 25 are provided, in which supporting, coupling and guiding mechanisms are present for allowing the sitting portion 21 to make the intended movement. It is observed that the headrest 24 is mounted on a bow-shaped part of the backrest frame 24. Of course, such headrest can also be mounted on another suitable vehicle part, such as a roll bar or a part belonging to a cage construction, in which case the vehicle seat could, during a collision, make a rearward movement as one whole.

Figure 7:
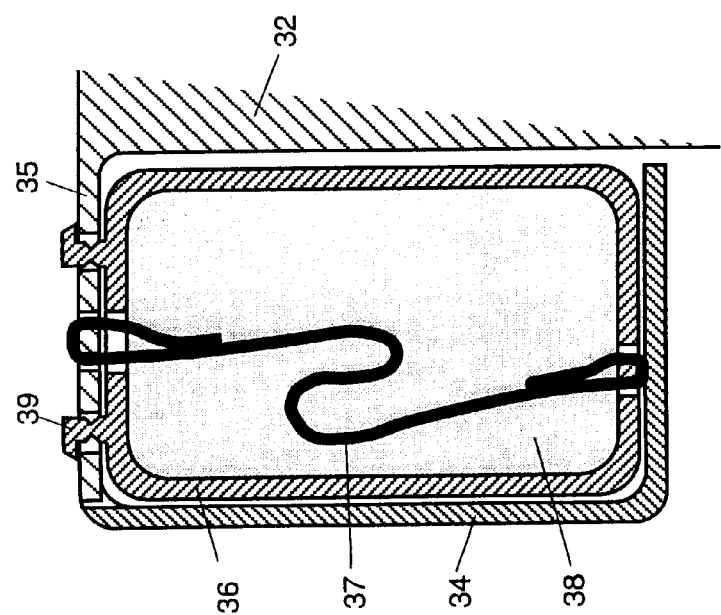
FIG. 7 shows a coupling piece in the normal position.

FIG. 7 shows, in cross section and in top plan view, a possible embodiment of the coupling and stopping means between a backrest frame and a back support part. A backrest frame 32 comprises an arm 35 which extends into a part 34 forming part of a further back support part, not shown. A tubular housing 36 is fixedly connected, in a manner not further shown, to the part 34. Located in the housing 36 is a stopping means, such as a belt, cable or strap 37 having one end attached to a wall of the housing 36 and its other end attached to the arm 35. Further, the housing 36 is filled with a synthetic foam 38 which crumbles upon deformation. The part 34 which belongs to the back support part is entirely loose from the backrest frame 32 and the arm 35. The coupling between the back support part and the backrest frame 32 takes place by means of hook projections 39 mounted on the housing 36. Such construction can for instance be arranged in the bulges 12a of the backrest shown in FIGS. 4 and 5.

Figure 8:
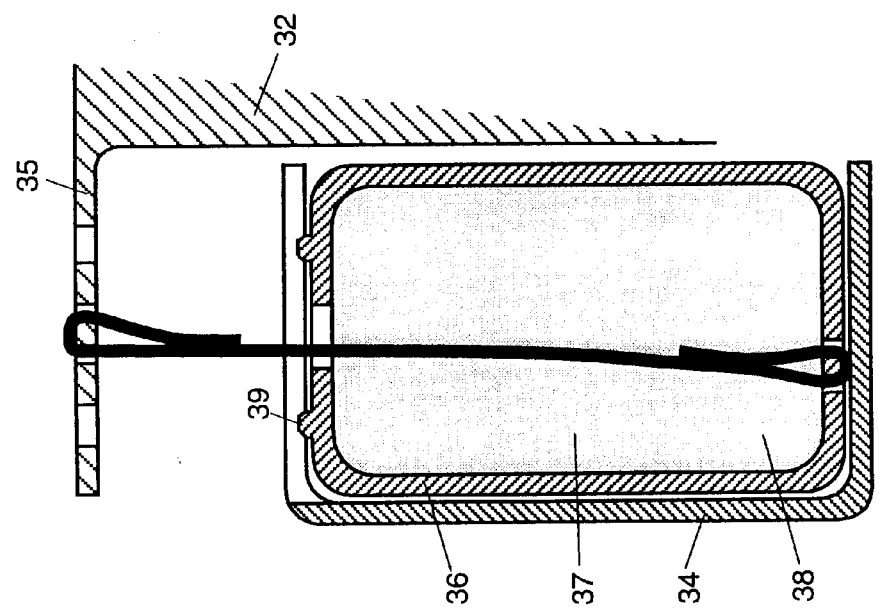
FIG. 8 shows the coupling piece of FIG. 7 after a collision.

In the event of a collision, the coupling by means of the hook projections 39 should be broken. To this end, those hook projections are provided with stem cuts defining a predetermined place of fracture. The situation that arises when the coupling is broken and the back support part is moved backwards is shown in FIG. 8. The top parts of the hook projections 39 are broken off, whereupon the forces exerted by the user of the vehicle seat have caused the back support part to move backwards, which movement is stopped when the strap 37 becomes taut. This movement is damped by the crumbling of the synthetic foam 38 during the tightening of the strap 37.

Figure 9:
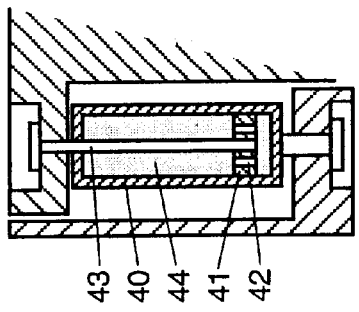
FIG. 9 shows a second embodiment of a coupling piece in the normal position.

In an embodiment as shown in FIGS. 4 and 5, two of the coupling pieces shown in FIG. 7 may suffice. If it is preferred that the back support part be displaced parallel or substantially parallel to itself, this can be realized by means of four of such coupling pieces. In that case, the lengths of the various straps determine the end position of the back support part after the displacement. The coupling piece shown in FIG. 7 is one of the many possible embodiments. Instead of a housing 36 with foam filling 38 and strap 37, a cylinder 40 with a piston 41 with through holes 42 and attached to a piston rod 43, fluid-damped by a fluid 44 which has to move through the holes 42 for having the piston 41 to be displaced with respect to the cylinder 40, as shown in FIGS. 9 and 10, may be considered. Further, the breaking projections 39 may be replaced by acceleration transducers which undo the coupling under the. appropriate conditions. In a spring-compressed construction, the breaking projections 39 may also be entirely omitted. It is also possible to use other buffer means, such as for instance springs for realizing the displacement and damping of the back support part, while, if so desired, those springs may be arrested in their compressed condition when the desired displacement of the back support part is reached. Of course, combinations of cylinders, which may or may not be fluid-damped, with springs or other buffer means, such as for instance rubber-elastic members, are also possible.

It is readily understood that within the framework of the invention as laid down in the appended claims, many further modifications and variants are possible in addition to the above-discussed embodiments and variations thereto. For instance, one may think of a partially swiveling and partially translating back support part, while for instance the swivel movement may be effected in the manner as shown in FIG. 5 and the translation takes place by shifting the back support part together with the sitting portion.

What is claimed:

1. A vehicle seat with a frame supporting a sitting portion, a backrest and a headrest situated above the backrest, the backrest comprising a back support part extending by a top part to a position adjacent the headrest and connected to the frame by means of a coupling which, during a forward displacement of the frame, from a predetermined acceleration, allows a displacement of at least a part of the back support part against the forward displacement, over a distance predetermined by stopping means arranged between the back support part and the frame, wherein at least the top part of the back support part is arranged for displacement relative to the adjoining headrest which is mounted in such a manner that during said displacement of the back support part allowed by the coupling, said headrest remains stationary relative to the frame.

2. A vehicle seat according to claim 1, wherein the coupling is arranged in such a manner that the back support part can move parallel to itself while the starting position is substantially maintained.

3. A vehicle seat according to claim 1, wherein members which are arranged between the back support part and the frame and which release the coupling during the predetermined acceleration of the frame, controlled by an acceleration transducer, are retractable.

4. A vehicle seat according to claim 1, wherein an energy-absorbing means is present for damping the displacement of the back support part relative to the frame.

5. A vehicle seat according to claim 1, wherein the stopping means allows the displacement of the back support part relative to the frame and limits said displacement to a desired value.

6. A vehicle seat according to claim 5, wherein the stopping means and energy-absorbing means are formed by hydraulic cylinders.

7. A vehicle seat according to claim 5, wherein the energy-absorbing means consists of a synthetic foam which fills a housing and in which the stopping means is embedded and which foam is crumbled by the stopping means which, upon displacement of the back support part relative to the headrest, limits said displacement.

8. A vehicle seat according to claim 1, wherein at least a part of the sitting portion is coupled to the back support part in such a manner that it can move together with the back support part.

9. A vehicle seat according to claim 8, wherein the stopping means and an energy-absorbing means are mounted between a location chosen from the group consisting of a displaceable sitting portion and a displaceable part thereof, and the frame.

10. A vehicle provided with at least one seat according to claim 1.

11. A vehicle according to claim 10, wherein the headrest is directly connected to a location chosen from the group consisting of the vehicle and a part fixedly connected thereto, instead of being connected to the frame.

* * * * *